United States Patent
Mukkara et al.

(10) Patent No.: US 8,683,574 B2
(45) Date of Patent: Mar. 25, 2014

(54) IDENTITY DRIVEN PEER-TO-PEER (P2P) VIRTUAL PRIVATE NETWORK (VPN)

(75) Inventors: Prakash Umasankar Mukkara, Bangalore (IN); Lloyd Leon Burch, Payson, UT (US)

(73) Assignee: Novell, Inc., Provo, UT (US)

( * ) Notice: Subject to any disclaimer, the term of this patent is extended or adjusted under 35 U.S.C. 154(b) by 1059 days.

(21) Appl. No.: 12/334,809

(22) Filed: Dec. 15, 2008

(65) Prior Publication Data

US 2010/0154050 A1 Jun. 17, 2010

(51) Int. Cl.
*H04L 29/00* (2006.01)
(52) U.S. Cl.
USPC .......... 726/15; 726/11; 380/247; 380/248; 380/249; 380/250
(58) Field of Classification Search
None
See application file for complete search history.

(56) References Cited

U.S. PATENT DOCUMENTS

| | | | |
|---|---|---|---|
| 7,206,934 B2 | 4/2007 | Pabla et al. | |
| 7,401,152 B2* | 7/2008 | Traversat et al. | 709/230 |
| 2005/0037787 A1* | 2/2005 | Bachner et al. | 455/502 |
| 2007/0226338 A1* | 9/2007 | Burch et al. | 709/225 |
| 2007/0233879 A1 | 10/2007 | Woods et al. | |
| 2008/0141358 A1 | 6/2008 | Lin et al. | |
| 2008/0222127 A1* | 9/2008 | Bergin | 707/5 |

* cited by examiner

*Primary Examiner* — Ghazal Shehni
(74) *Attorney, Agent, or Firm* — Schwegman Lundberg & Woessner, P.A.

(57) ABSTRACT

Techniques for identity-based Peer-to-Peer (P2P) Virtual Private Networks (VPN's) are provided. First and second principals authenticate to a trusted third party. The first principal subsequently requests a P2P VPN with the second principal. The second principal is contacted on behalf of the first principal and permission is acquired. The first and second principals are then sent commands to directly establish a P2P VPN communication session with one another.

24 Claims, 4 Drawing Sheets

United States Patent US 8,683,574 B2

IDENTITY DRIVEN PEER-TO-PEER (P2P) VIRTUAL PRIVATE NETWORK (VPN)

BACKGROUND

Increasingly, individuals governments, and enterprises are relying on the Internet to conduct their affairs. The primary mechanism to conduct affairs over the Internet is a World-Wide Web (WWW) browser; although other specialized applications also permit interaction over the Internet.

Some Internet transactions conducted by users are innocuous requiring little to no security. Yet, many transactions are sensitive in nature involving confidential or proprietary information that an individual or enterprise desires to keep secret and secure.

To deal with sensitive transactions, enterprises generally provide Virtual Private Network (VPN) connections to their assets. This is particularly useful when an employee is outside an enterprise's firewall and desires to connect to the internal Intranet of the enterprise. A VPN creates a secure communication session between a user and an enterprise server over an insecure network, such as the Internet.

Generally, these VPN's are between external users that connect to an enterprise's Intranet, as discussed above. However, a new breed of VPN's has emerged, which permits a Peer-To-Peer (P2P) connection between two clients over the Internet. This has a variety of benefits, such as limiting the external client to just assets or information available to the peer client, and others.

To allow a client-to-client connection there has to be a trust relationship established between the two participating clients. To date, establishing and managing this trust relationship has been problematic to set up from an enterprise's perspective. The relationship has to be done via a user-to-user trust situation, which has substantial support and security issues that the enterprise must attempt to manage. Moreover, an enterprise's firewall is difficult to deal with and there is generally very little corporate oversight of that firewall.

Therefore, it is desirable to improve the techniques for establishing and managing P2P VPN's.

SUMMARY

In various embodiments, techniques for identity driven P2P VPN's are provided. In an embodiment, a method for establishing an identity-based P2P VPN is presented.

DETAILED DESCRIPTION

A "resource" includes a user, content, a processing device, a node, a service, an application, a system, a gateway, a directory, a data store, a World-Wide Web (WWW) site, an end-user, groups of users, combinations of these things, etc. The terms "service," "module," "software," and "application" may be used interchangeably herein and refer to a type of software resource that includes instructions, which when executed by a machine performs operations that change the state of the machine and that may produce output.

A "client" or "client workstation" is a machine (computer, processing device, etc.) that a user uses to access a network. The client includes a processing environment. As used herein the terms "client," "desktop," "client machine,""client workstation," and "workstation" may be used interchangeably and synonymously.

A "server" is a machine that the client interacts with over a network, such as the Internet. The user, via its browser or other service on the client, attempts to establish a connection with the server or to a resource of the server.

Various embodiments of this invention can be implemented in existing network architectures, browsers, proxies, agents, storage systems, security systems, data centers, and/or communication devices. For example, in some embodiments, the techniques presented herein are implemented in whole or in part in the Novell® network, proxy server products, email products, operating system products, data center products, and/or directory services products distributed by Novell®, Inc., of Provo, Utah.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-5.

Figure 1:
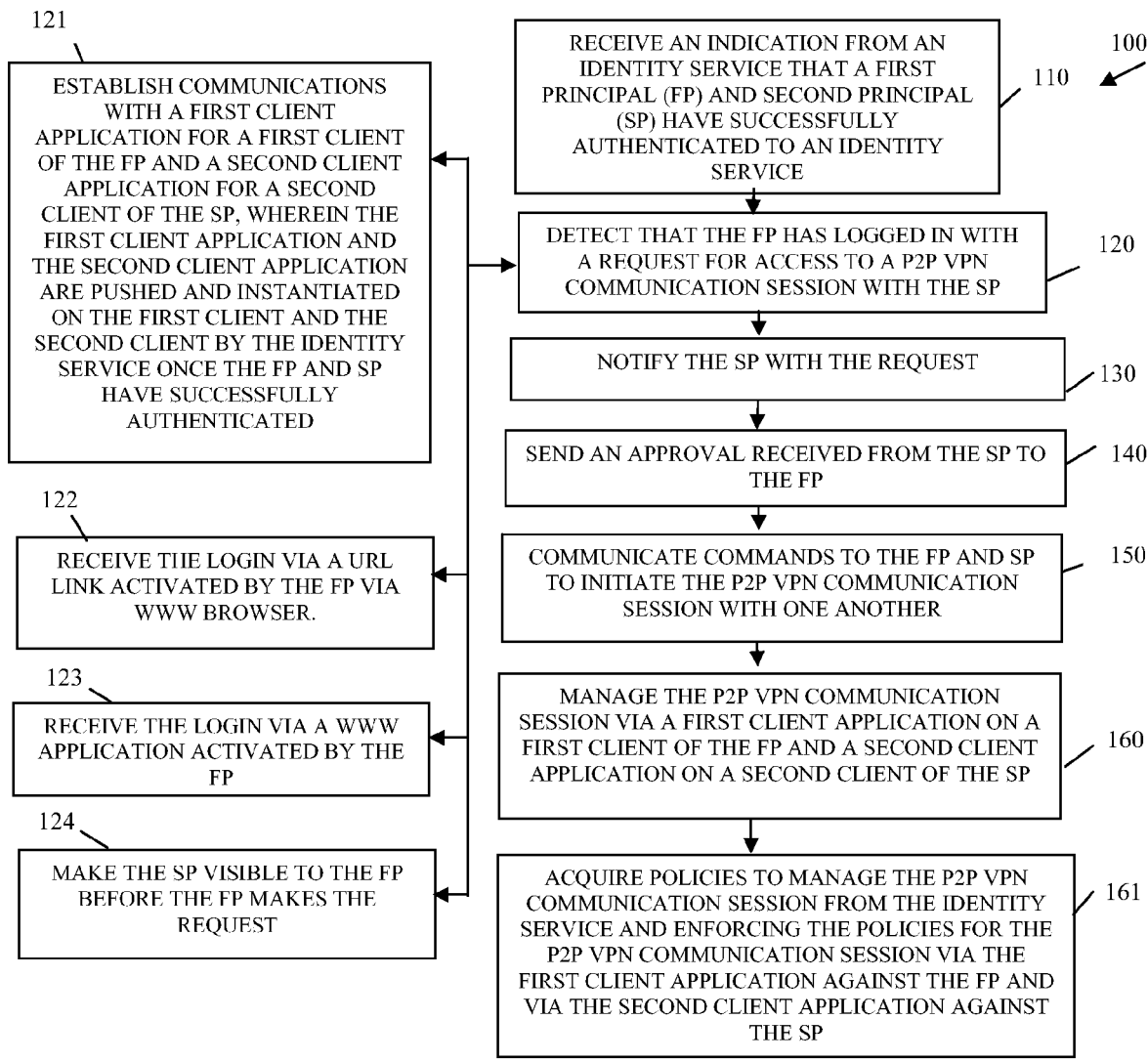
FIG. 1 is a diagram of a method for establishing an identity-based P2P VPN, according to an example embodiment.

FIG. 1 is a diagram of a method 100 for establishing an identity-based P2P VPN, according to an example embodiment. The method 100 (hereinafter referred to as P2P VPN service) is implemented as software instructions in a computer-readable storage medium and is executed by a processor (such as a computer, etc.). The P2P VPN service is also operational over a network; the network can be wired, wireless, or a combination of wired and wireless.

At 110, the P2P VPN service receives an indication from an identity service that a first principal and a second principal have successfully authenticated to that identity service. The identity service is trusted and in secure communication with the P2P VPN service. The first and second principals authenticate themselves via the identity service and the identity service informs the P2P VPN service that the first and second principals have been authenticated.

At 120, the P2P VPN service detects that a first principal has logged into the P2P VPN service and requested access to a P2P VPN communication session with the second principal. Once the first principal is logged into the P2P VPN service a variety of beneficial communications can occur. This can be done in a number of manners.

For instances, at 121, the P2P VPN service establishes communications with the first principal via a first principal application that executes on a first client of the first principal. Communications are also established between the second principal and the P2P VPN service via a second application that executes on a second client of the second principal. In an embodiment, the first and second applications are dynamically pushed to and executed on the first and second clients by the identity service when the first and second principals are authenticated by the identity service. The first and second applications may run in the background of the first and second principals or they may be detectable by the first and second principals as small unobtrusive browser popup windows that appear on the first and second clients. Two way communications are achieved between the first and second clients and the P2P VPN service via the first and second applications.

According to an embodiment, at 122, the P2P VPN service receives the login by the first principal via a Uniform Resource Locator (URL) that is activated by the first principal via a World-Wide Web (WWW) browser. So, the first principal traverses to the URL from the WWW browser and activation of the URL causes the login interaction between the first principal and the P2P VPN service.

In another case, at 123, the P2P VPN service receives the login via a WWW application that the first principal activates on a first client of the first principal.

In a particular situation, at 124, the P2P VPN service can make the second principal visible to the first principal once the first principal logs into the P2P VPN service but before the first principal makes the request for the P2P VPN communication session.

At 130, the P2P VPN service notifies the second principal with the request. At this point, the first and second principals are authenticated via the identity service (as was discussed above). Furthermore, the first principal has logged into the P2P VPN service and made a request for a P2P VPN communication session with the second principal. The P2P VPN service then contacts the second principal with the request that the first principal wants to establish a P2P VPN communication session with the second principal.

At 140, the P2P VPN service sends an approval to the first principal. This presupposes that the second principal authorized the request for the P2P VPN communication session and communicates its acceptance back to the P2P VPN service, at which point the P2P VPN service sends the approval to the first principal. This indicates that it is okay for the first principal to establish a P2P VPN communication session with the second principal.

At 150, the P2P VPN service communicates commands to the first and second principals that permit the first and second principals to initiate the P2P VPN communication session with one another. These commands can include encryption keys or tokens that the first and second principals are to use with one another. It is also noted that both the first and second principals may be anonymously connected in the P2P VPN communication session. This is discussed in greater detail below with the discussion of the remaining figures.

At 160, the P2P VPN service manages the P2P VPN communication session via a first application that processes on a first client of the first principal and via a second application that processes on a second client of the second principal. Example aspects as to how the first and second applications are initially established on the first and second clients were presented above.

In continuing with the embodiment of 160 and at 170, the P2P VPN service acquires policies to manage the P2P VPN communication session from an identity service and enforces those policies for the P2P VPN communication session via the first client application against the first principal and via the second client application against the second principal. So, policies can be dynamically acquired and enforced via the first and second applications while the P2P VPN communication session is ongoing.

Figure 2:
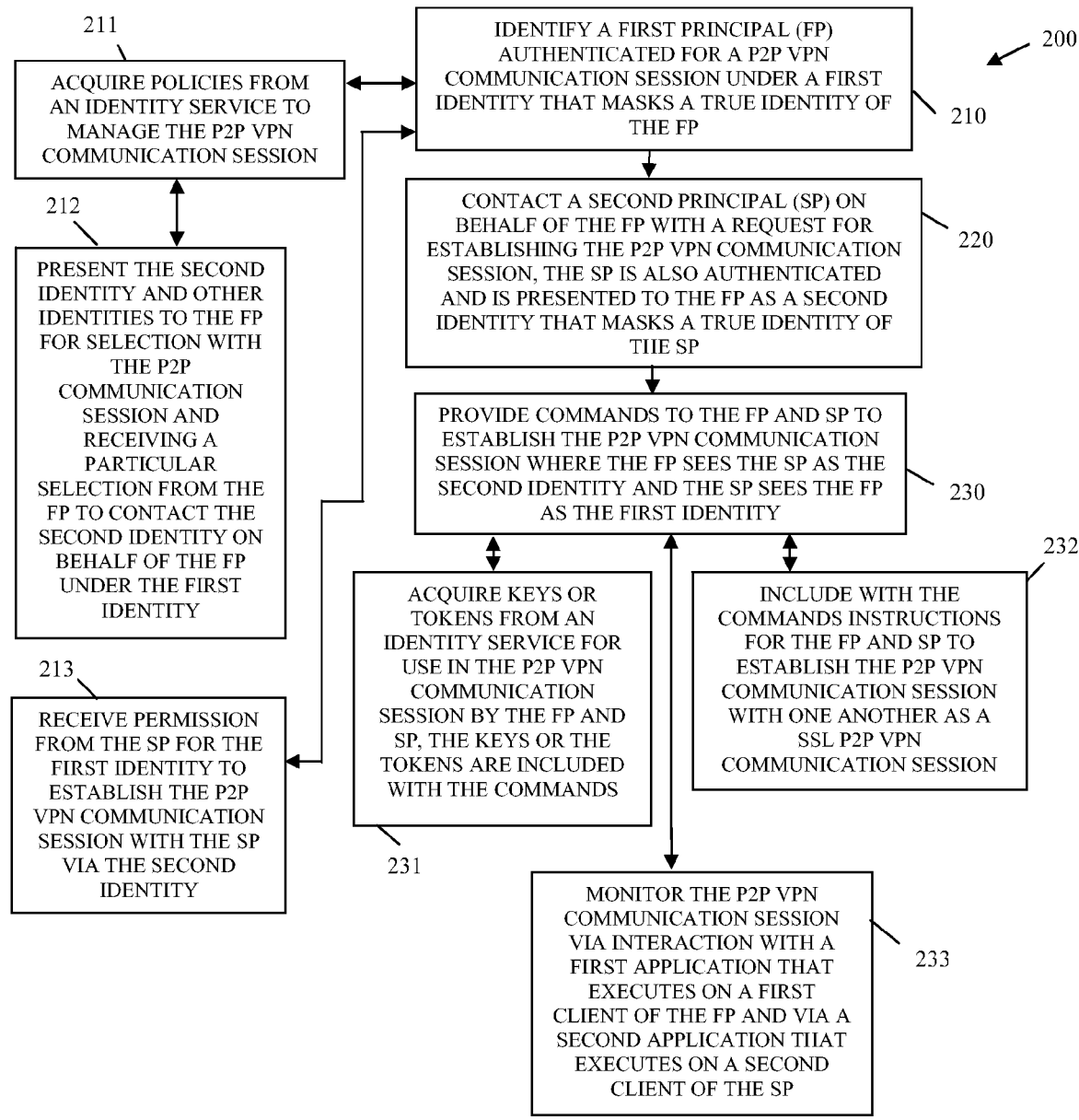
FIG. 2 is a diagram of another method for establishing an identity-based P2P VPN, according to an example embodiment.

FIG. 2 is a diagram of another method 200 for establishing an identity-based P2P VPN, according to an example embodiment. The method 200 (herein after referred to as "VPN service") is implemented in a machine-accessible and computer-readable medium as instructions. The instructions when processed by one or more machines (computer, processor(s), processing device, etc.) perform the processing depicted in the FIG. 2. The VPN service is operational over a network and the network is wired, wireless, or a combination of wired and wireless.

At 210, VPN service identifies a first principal that is authenticated for a P2P VPN communication session under a first identity that masks a true identity of the first principal. In other words, the first principal assumes an identity, such as an alias identity, that does not disclose the true identity of the first principal.

In an embodiment, at 211, the VPN service acquires policies from an identity service to manage the P2P VPN communication session. The policies can be dynamically acquired and dynamically enforced via the VPN service.

According to an embodiment, at 212, the VPN service presents the second identity and other identities to the first principal for selection with the P2P VPN communication session. In response to this presentation of identities, the VPN service receives back from the first principal a particular selection to contact the second principal. That is, the first principal selects the second principal as the one with which the first principal desires to establish the P2P VPN communications session. The VPN service then contacts the second principal on behalf of the first principal and makes the request that the first and second principals establish a P2P VPN communication session with one another.

In another situation, at 213, the VPN service receives permission from the second principal for the first identity associated with the first principal to establish the P2P VPN communication session with a second identity associated with the second principal.

So, at 220, the VPN service essentially contacts the second principal on behalf of the first principal and identifies the first principal as the first identity to the second principal. The contact is done to acquire permission of the second principal for the first identity (which masks the true identity of the first principal from the second principal) to establish the P2P VPN communication session with the second principal. It is noted that the second principal masks its identity from the first principal during the subsequent P2P VPN communication session by appearing to the first principal as a second identity that masks the true identity of the second principal from the first principal. The second principal is also authenticated via the third party service, such as a common trusted identity service. So, both the first and second principals are authenticated to one another via a common third party that they both know and trust. The identity service essentially tells the first principal that the first principal can trust the second identity associated with the second principal and tells the second principal that the second principal can trust the first identity associated with the first principal. The first and second principals do not know the true identity of one another and yet are authenticated to one another for purposes of establishing a P2P VPN communication session with one another. This is done via the VPN service as noted herein above and below.

At 230, the VPN service provides commands to the first and second principals to establish the P2P VPN communication session with one another, where the first principal sees the second principal as the second identity and the second principal sees the first principal as the first identity. Again, the true identities of the first and second principals remain anonymous and undisclosed to the first and second principals during the P2P VPN communication session.

According to an embodiment, at 231, the VPN service acquires keys or tokens from an identity service for use in the P2P VPN communication session by the first and second principals. The keys or tokens are supplied with the commands that are provided at 230. These keys or tokens can be used for custom encryption and decryption during the P2P VPN communication session.

In another case, at 232, the VPN service includes with the commands instructions for the first and second principals to establish the P2P VPN communication session with one another as a Secure Socket Layer (SSL) P2P VPN communication session.

In still another situation, at 233, the VPN service monitors the P2P VPN communication session that occurs between the first and second principals via a first application that executes on a first client of the first principal and via a second application that executes on a second client of the second principal. Example aspects of these applications were presented above with reference to the method 100 of the FIG. 1.

Figure 3:
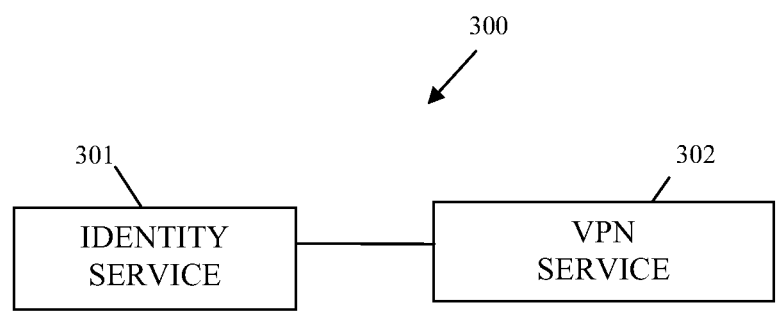
FIG. 3 is a diagram of an identity-driven P2P VPN system, according to an example embodiment.

FIG. 3 is a diagram of an identity-driven P2P VPN system 300, according to an example embodiment. The identity-driven P2P VPN system 300 is implemented in a machine-accessible and computer-readable medium as instructions. The instructions when processed by one or more machines (computer, processing device, processor(s), etc.) perform the processing depicted in the methods 100 and 200 of the FIGS. 1 and 2, respectively. The identity-driven P2P VPN system 300 is operational over a network and the network is wired, wireless, or a combination of wired and wireless.

The identity-driven P2P VPN system 300 includes an identity service 301 and a VPN service. Each component of the identity-driven P2P VPN system 300 and its interaction with the remaining components will now be discussed in turn.

The identity service 301 is implemented in a computer-readable storage medium as instructions that are executed by a processor and is operational over a network. Example aspects of the third-party authentication and policy services supplied by the identity service 301 were presented above with reference to the methods 100 and 200 of the FIGS. 1 and 2, respectively.

The identity service 301 authenticates a first principal and a second principal for a trusted relationship with one another over the network. A trusted relationship is one in which the parties are authenticated to one another via the identity service 301 and communicate securely with one another.

The identity service 301 also is trusted and securely communicates with the VPN service 302.

According to an embodiment, the identity service 301 pushes and initiates a first application on a first client of the first principal and a second application on a second client of the second principal for communication to and from the VPN service 302.

In some cases, the first and second applications regularly send heartbeat messages to the VPN service 302. Some of the heartbeat messages include descriptive information regarding a P2P VPN communication session that the first and second principals are engaged in. The descriptive information is communicated back to the VPN service 302 for purposes of permitting the VPN service 302 to dynamically manage and monitor the P2P VPN communication session.

In a particular situation, the VPN service 302 communicates policies acquired from the identity service 301 to the first application and the second application for the first and second applications to enforce against the first and second principals during the P2P VPN communication session with one another.

The VPN service 302 can also log transaction details associated with the P2P VPN communication session based on information provided to the VPN service 302 via the first and second applications.

According to an embodiment, the identity service 301 provides a first alias identity for the first principal and a second alias identity for the second principal. The VPN service 302 ensures that the first and second principals just see the first and second alias identities before establishing and while communicating over the P2P VPN communication session. In other words, the first and second principals are anonymously connected to one another in the P2P VPN communication session and yet are assured that each are authenticated and secure because of the authentication performed via the identity service 301.

The VPN service 302 is implemented in a computer-readable storage medium as instructions that executed on a different processor from the processor that executes instructions associated with the identity service 301. Moreover, the VPN service 302 is operational over a network. Example aspects of the VPN service 302 were presented in detail above with reference to the methods 100 and 200 of the FIGS. 1 and 2, respectively.

The first principal logs into the VPN service 302 at which point the VPN service 302 presents the second principal to the first principal. The first principal then makes a request to the VPN service 302 for the VPN service 302 to establish or cause to establish a P2P VPN communication session between the first and second principals. The VPN service 302 acquires acceptance from the second principal and provides commands to the first and second principals for establishing the P2P VPN communication session with one another.

The VPN service 302 acts as a secure middleman that permits the first and second principals to identify one another (perhaps via secure alias identities) and to establish a P2P VPN communication session with one another. The VPN service 302 uses unobtrusive applications that execute on each client of the principals to monitor and manage the P2P VPN communication session in real time. Aspects of this were discussed in detail above.

Figure 4:
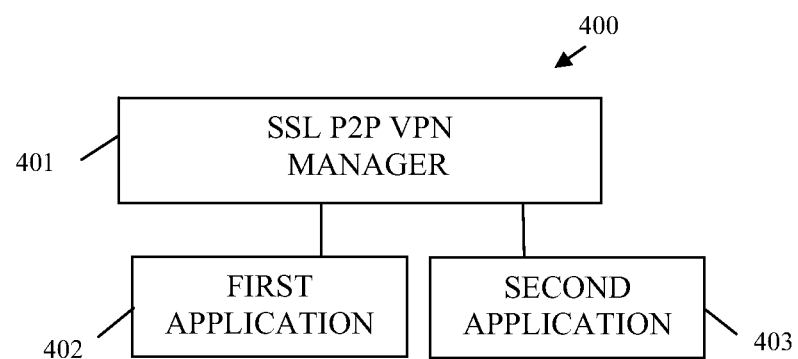
FIG. 4 is a diagram of an identity-driven P2P VPN system, according to an example embodiment.

FIG. 4 is a diagram of an identity-driven P2P VPN system 400, according to an example embodiment. The identity-driven P2P VPN system 400 is implemented as instructions on or within a machine-accessible and computer-readable storage medium. The instructions when executed by machines (processors) of a network perform, among other things, processing depicted with respect to the methods 100 and 200 of the FIGS. 1 and 2, respectively, and with respect to the system 300 of the FIG. 3. The identity-driven P2P VPN system 400 is also operational over a network, and the network is wired, wireless, or a combination of wired and wireless.

The identity-driven P2P VPN system 400 includes a SSL P2P VPN manager 401, a first application 402, and a second application 403. Each of these and their interactions with one another will now be discussed in turn.

The SSL P2P VPN manager 401 is implemented in a computer-readable storage medium as instructions that execute on a server over a network. Example aspects of the SSL P2P VPN manager 401 were presented above with reference to the methods 100 and 200 of the FIGS. 1 and 2, respectively, and with respect to the system 300 of the FIG. 3.

The SSL P2P VPN manager 401 facilitates establishment of an anonymous P2P VPN communication session between a first principal and a second principal over the network. The SSL P2P VPN manager 401 also manages the subsequent SSL P2P VPN communication session that is established between the first and second principals. This management is achieved in real time via the first application 402 that is associated with the first principal and is achieved in real time via the second application 403 that is associated with the second principal.

According to an embodiment, the SSL P2P VPN manager 401 pushes policies to the first application 402 and the second application 403 for the first 402 and second 403 applications to enforce in real time and dynamically during the SSL P2P VPN communication session between the first and second principals.

In a particular situation, the policies are identified for use based on identities assigned to the first and second principals.

In another case, the SSL P2P VPN manager 401 tracks and monitors the SSL P2P VPN communication session via information received from the first and second applications regarding transactions occurring between the first and second principals during the SSL P2P VPN manager 401.

The first application 402 is implemented in a computer-readable storage medium as instructions that execute on a first client over the network. The first client used by the first principal. In an embodiment, the first application 402 is pushed to the first client when the first principal authenticates to the SSL P2P VPN manager 401 or authenticates to a trusted third-party service, such as an identity service.

The second application 403 is also implemented in a computer-readable storage medium as instructions that execute on a second client over the network. Similar to the first application 402, the second application 403 in some cases is dynamically pushed and initiated on the second client once the second principal authenticates to the SSL P2P VPN manager 401 or authenticates to a trusted third-party service, such as an identity service.

Figure 5:
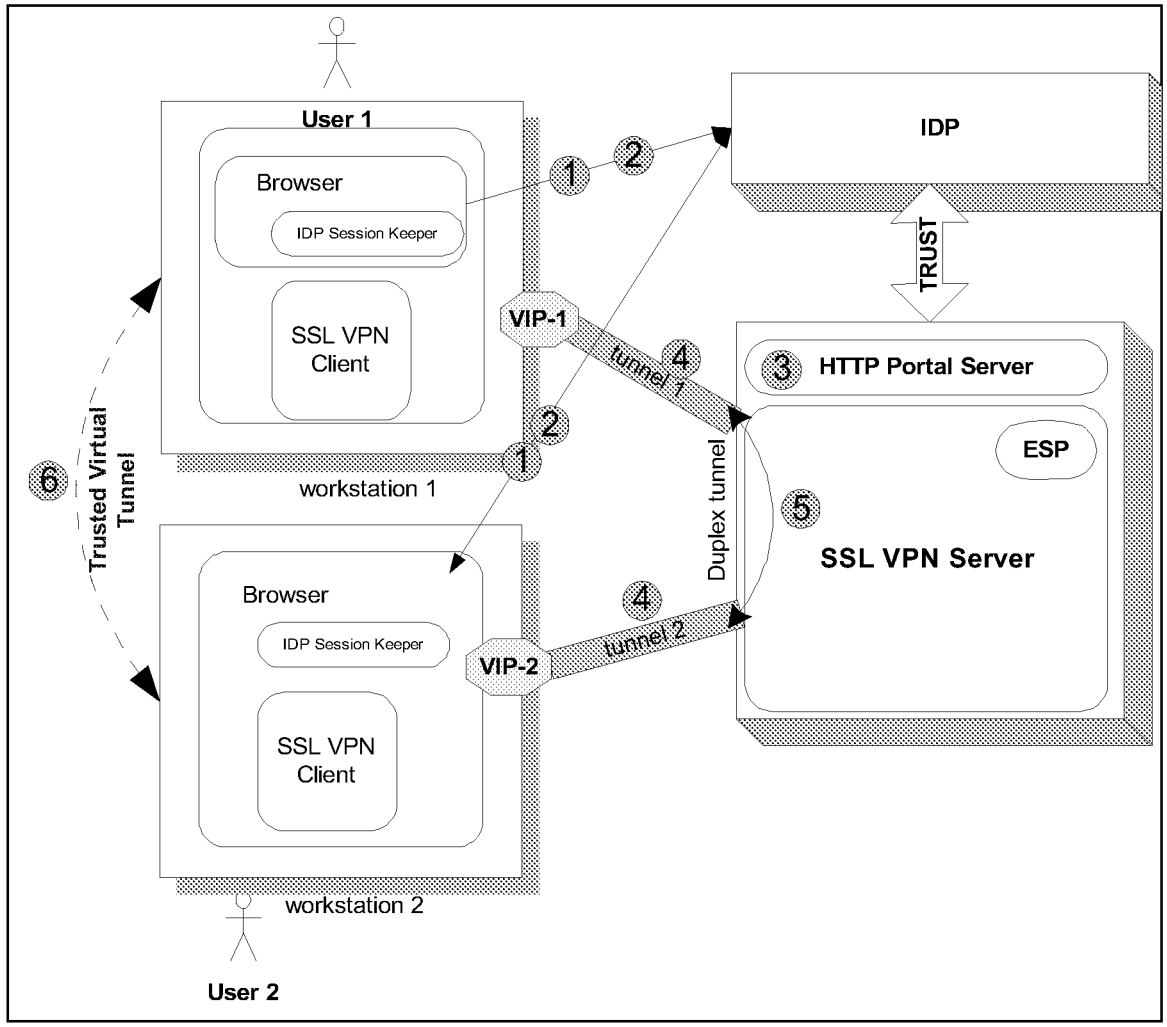
FIG. 5 is a diagram of an example architecture for identity-based P2P VPN establishment and management techniques, according to an example embodiment.

FIG. 5 is a diagram of an example architecture for identity-based P2P VPN establishment and management techniques, according to an example embodiment. The components of the architecture are implemented as instructions on or within a machine-accessible and computer-readable storage medium. The instructions when executed by machines (processors) of a network perform, among other things, processing depicted with respect to the methods 100 and 200 of the FIGS. 1 and 2, respectively, and with respect to the systems 300 and 400 of the FIGS. 3 and 4, respectively. The architecture components are also operational over a network, and the network is wired, wireless, or a combination of wired and wireless.

An example trusted virtual tunnel establishment sequence is described below.

User1 (type of first principal) and User2 (type of second principal) are both authenticated at the IDP (identified in FIG. 5 as (1)).

At the end of logging into an Identity Provider (IDP or identity service), an IDP login process instantiates a session keeper by spawning another small browser window (first and second applications on the clients of the first and second principals (User1 and User2). The IDP session keeper continually sends keep alive requests (such as by refreshing the window) to both the IDP as well as to the portal server (SSL P2P VPN manager or service). Any message that needs to be communicated to the workstation from either the IDP or portal server happens through keep-alive responses.

At some point in time, User 1 wishes/desires to access User 2's workstation (for a SSL P2P communication session). User 1 logs into the portal (SSL P2P VPN manager or service) at a given URL (or logs in into the portal server through using the WWW application) (identified in FIG. 5 as (2)). Policies are set on the IDP and the Portal server to show which users User1 can see. User1 and User2 are configured to be mutually trusted and are visible to each other via the portal server. User1 initiates an SSL VPN request with User2. The IDP session keeper on the workstation 2 is notified about this request using the "keep alive" response. The IDP session keeper prompts User2 about the connection request from User1 and gives complete details about User1 and workstation1 (client of User1). User2 accepts the connection request. The Portal server forwards the approval to IDP session keeper1. After the mutual agreement for secure connection building, the portal server sends commands to the IDP session keeper1 and the IDP session keeper2 to initiate SSLVPN tunnel build up requests.

In an embodiment, the controlled and managed policies, which are identity based, are shared among the IDP, SSL VPN server and portal server using a Java® Messaging Service (JMS) bus (identified in FIG. 5 as (3)).

The SSL VPN server can build a duplex tunnel between the tunnel1 and tunnel2 end points on the server (i.e., data received from workstation 1 over tunnel 1 is sent to workstation2 over tunnel 2 and vice versa) (identified in FIG. 5 as (4)).

At this point, User1 (via Workstation 1) can access any permitted application (strictly controlled by configured policies on the HTTP portal and SSL VPN server) (identified in FIG. 5 as (5)) on the workstation 2 using VIP-2 IP address as if it is in the LAN and User2 and do the same with workstation 1, adhering to the configured policies (identified in FIG. 5 as (6) Trusted Virtual Tunnel).

The techniques presented herein permit an anonymous user (type of principal), who is trusted by an administrator by a policy, to have secure communication with another anonymous user. Each user's workstation and true identity are unknown to the other but still the communication is secure and trusted in a P2P VPN communication session. Virtual groups can be formed without sharing identity and workstation details. But the complete communication mechanism is governed by powerful identity based policies in forming these P2P connections.

The P2P connections are policy controlled. Multiple attributes and tokens, which are trusted by a mutually trusted identity service, are used in establishing this P2P tunnel.

Though the techniques allow the user to maintain anonymity, the SSL VPN service and the identity service have the ability to track the identities of different users through policies, logs, and auditing mechanisms. A true identity can be discovered by the administrator when needed. Pseudo names are used by the identity service and these pseudo names can be tracked to real and true identities at the identity service. The SSLVPN service can track the machine details (MAC address, Operating System type, etc). Corporate oversight is present in this seamlessly established P2P VPN connection or tunnel.

P2P communication is completely enabled and controlled by an administrator. There is no inherent risk or uncontrollability. Without this, users may be exposed to each other.

The duplex tunnel between each workstation and P2P SSL VPN service is identity enabled. This allows policy driven duplex communications.

It is now appreciated how secure browsing can be achieved, such that a resource or server can trust that each transaction of a session is coming from a browser that was initially used by a user to authenticate to the resource or server. This is a substantial improvement over what has been achieved to date.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented in a non-transitory computer-readable storage medium that executes on a processor to perform the method of:
receiving, by the processor, an indication from an identity service that a first principal and second principal have successfully authenticated to an identity service;
detecting, by the processor, that the first principal has logged in with a request for access to a Peer-To-Peer (P2P) Virtual Private Network (VPN) communication session with the second principal;
notifying, by the processor, the second principal with the request when the first principal is logged in and makes the request;
sending, by the processor, an approval received from the second principal to the first principal indicating the second principal authorized the first principal to connect with the second principal, the second principal communicates the approval back to the method in real time based on the notification of the request made by the first principal; and
communicating, by the processor, commands to the first and second principals to initiate the P2P VPN communication session with one another and creating a duplex tunnel between workstations associated with the first and second principals that is identity based.

2. The method of claim 1 further comprising, managing, by the processor, the P2P VPN communication session via a first client application on a first client of the first principal and a second client application on a second client of the second principal.

3. The method of claim 2, wherein managing further includes acquiring policies to manage the P2P VPN communication session from the identity service and enforcing the policies for the P2P VPN communication session via the first client application against the first principal and via the second client application against the second principal.

4. The method of claim 1. wherein detecting further includes establishing communications with a first client application for a first client of the first principal and a second client application for a second client of the second principal, wherein the first client application and the second client application are pushed and instantiated on the first client and the second client by the identity service once the first principal and second principal have successfully authenticated.

5. The method of claim 1, wherein detecting further includes receiving the login via a Universal Resource Locator (URL) link activated by the first principal via World-Wide Web (WWW) browser.

6. The method of claim 1, wherein detecting further includes receiving the login via a World-Wide Web (WWW) application activated by the first principal.

7. The method of claim 1, wherein detecting further includes making the second principal visible to the first principal before the first principal makes the request.

8. A method implemented in a non-transitory computer-readable storage medium that executes on a processor performing the method, comprising:
identifying, by the processor, a first principal authenticated for a Peer-To-Peer (P2P) Virtual Private Network (VPN) communication session under a first identity that masks a true identity of the first principal;
contacting, by the processor, a second principal on behalf of the first principal with a request for establishing the P2P VPN communication session, wherein the second principal is also authenticated and is presented to the first principal as a second identity that masks a true identity of the second principal, the second principal is contacted in real time for permission for the first identity to connect with the second principal when the first principal makes the request; and
providing, by the processor, commands to the first and second principals to establish the P2P VPN communication session where the first principal sees the second principal as the second identity and the second principal sees the first principal as the first identity and creating a duplex tunnel between workstations associated with the first and second principals that is identity based.

9. The method of claim 8, wherein identifying further includes acquiring policies from an identity service to manage the P2P VPN communication session.

10. The method of claim 9, wherein acquiring further includes presenting the second identity and other identities to the first principal for selection with the P2P communication session and receiving a particular selection from the first principal to contact the second identity on behalf of the first principal under the first identity.

11. The method of claim 8, wherein contacting further includes receiving permission from the second principal for the first identity to establish the P2P VPN communication session with the second principal via the second identity.

12. The method of claim 8, wherein providing further includes acquiring keys or tokens from an identity service for use in the P2P VPN communication session by the first and second principals, wherein the keys or the tokens are included with the commands.

13. The method of claim 8, wherein providing further includes including with the commands instructions for the first and the second principal to establish the P2P VPN communication session with one another as a Secure Socket Layer (SSL) P2P VPN communication session.

14. The method of claim 8, wherein providing further includes monitoring the P2P VPN communication session via interaction with a first application that executes on a first client of the first principal and via a second application that executes on a second client of the second principal.

15. A processor-implemented system, comprising:
a processor having an identity service implemented in a non-transitory computer-readable storage medium and that is executed by the processor and operational over a network; and
a different processor having an Virtual Private Network (VPN) service implemented in a non-transitory computer-readable storage medium that is executed by the different processor and operational over the network;

wherein the identity service authenticates a first principal and a second principal for a trusted relationship with one another over the network and the identity service securely communicates with the VPN service, and wherein when the first principal logs into the VPN service, the VPN service presents the second principal to the first principal and the first principal makes a request to the VPN service for the VPN service to establish a Peer-To-Peer (P2P) VPN communication session between the first principal and the second principal, and wherein the VPN service requests and acquires acceptance from the second principal in real time when the second principal is presented with the request and provides commands to the first and second principals for establishing the P2P VPN communication session with one another and creating a duplex tunnel between workstations associated fir the first and second principals that is identity based.

16. The system of claim 15, wherein the identity service pushes and initiates a first application on a first client of the first principal and a second application on a second client of the second principal for communication to and from the VPN service.

17. The system of claim 16, wherein the first application and the second application regularly send heartbeat messages to the VPN service, and wherein some of the heartbeat messages include descriptive information regarding the P2P VPN communication session that is communicated back to the VPN service for purposes of managing the P2P VPN communication session.

18. The system of claim 16, wherein the VPN service communicates policies acquired from the identity service to the first application and the second application for the first and second applications to enforce during the P2P VPN communication session with one another.

19. The system of claim 16, wherein the VPN service logs transaction details associated with the P2P VPN communication session based on information provided to the VPN service via the first and second applications.

20. The system of claim 15, wherein the identity service provides a first alias identity for the first principal and a second alias identity for the second principal, and wherein the VPN service ensures that the first and second principals just see the first and second alias identities before establishing and while communication over the P2P VPN communication session.

21. A processor-implemented system, comprising:
a server having Secure Socket Layer (SSL) Peer-To-Peer (P2P) Virtual Private Network (VPN) manager implemented in a non-transitory computer-readable storage medium and to execute on the server over a network;
a first client having a first application implemented in a non-transitory computer-readable storage medium and to execute on the first client over the network; and
a second client having a second application implemented in a non-transitory computer-readable storage medium and to execute on the second client over the network;
wherein the SSL P2P VPN manager facilitates establishment of an anonymous P2P VPN communication session between a first principal and a second principal over the network and manages the subsequent SSL P2P VPN communication session between the first and second principal via the first application associated with the first principal and the second application associated with the second principal, when a connection is requested between the first and second principals by one of the principals, the other non-requesting principal provides acceptance for the connection to continue in real time and based on the connection requested and when a connection is established a duplex tunnel between the first and second clients is established that is identity based.

22. The system of claim 21, wherein the SSL P2P VPN manager pushes policies to the first and second applications for the first and second applications to enforce during the SSL P2P VPN communication session between the first and second principals, 23. The system of claim 21, wherein t e policies are identified for use based on identities assigned to the first and second principals.

24. The system of claim 21, wherein the SSL P2P VPN manager tracks and monitors the SSL P2P VPN communication session via information received from the first and second applications regarding transactions occurring between the first and second principals during the SSL P2P VPN manager.

* * * * *

UNITED STATES PATENT AND TRADEMARK OFFICE
CERTIFICATE OF CORRECTION

PATENT NO. : 8,683,574 B2
APPLICATION NO. : 12/334809
DATED : March 25, 2014
INVENTOR(S) : Mukkara et al.

It is certified that error appears in the above-identified patent and that said Letters Patent is hereby corrected as shown below:

In the Claims

In column 9, line 56, in Claim 4, delete "claim 1." and insert --claim 1,--, therefor In column 9, line 67, in Claim 5, delete "browser," and insert --browser.--, therefor In column 12, line 9-10, in Claim 21, delete "anon-transitory" and insert --a non-transitory--, therefor In column 12, line 33, in Claim 22, delete "principals," and insert --principals.--, therefor In column 12, line 34, in Claim 23, delete "t e" and insert --the--, therefor Signed and Sealed this
Twenty-first Day of October, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,683,574 B2  
APPLICATION NO. : 12/334809  
DATED : March 25, 2014  
INVENTOR(S) : Mukkara et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1196 days.

Signed and Sealed this
Fourteenth Day of July, 2015

Michelle K. Lee
*Director of the United States Patent and Trademark Office*